March 1, 1966    C. P. RILEY, JR., ET AL    3,238,226
SYNTHESIS OF HYDRAZINE, SEMI-CARBAZIDE, AND
HYDRAZINEDICARBONAMIDE
Filed Dec. 11, 1963
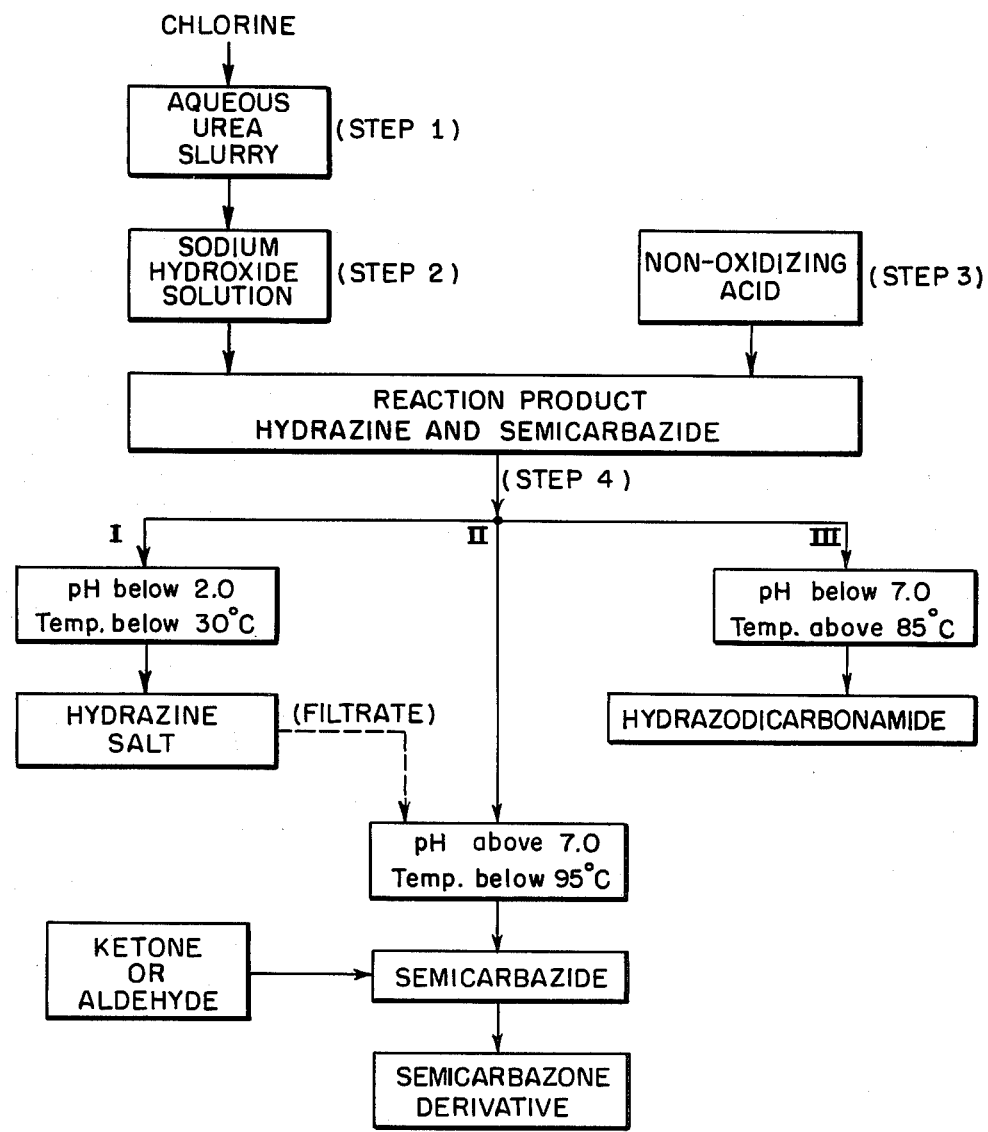
INVENTORS
CHARLES P. RILEY, JR.
RICHARD STRAUSS
WILLIAM P. ter HORST
BY
ATTORNEYS

United States Patent Office 3,238,226
Patented Mar. 1, 1966

3,238,226
SYNTHESIS OF HYDRAZINE, SEMI-CARBAZIDE, AND HYDRAZINEDICARBONAMIDE
Charles P. Riley, Jr., Lowell, and Richard Strauss, Lexington, Mass., and William P. Terhorst, Rehoboth, Del., assignors, by mesne assignments, to National Polychemicals, Inc.
Filed Dec. 11, 1963, Ser. No. 329,836
23 Claims. (Cl. 260—347.3)

This application is a continuation-in-part of Serial No. 174,264, filed February 19, 1962, now abandoned.

Our invention relates to a novel process for making hydrazodicarbonamide, and in particular concerns an improved process for making hydrazine, semicarbazide, and hydrazodicarbonamide.

Hydrazine has been conventionally prepared by the Raschig process, which as its first step reacts chlorine with an aqueous solution of sodium hydroxide to form sodium hypochlorite. This hypochlorite solution is in the second step reacted with urea, or in one modification, ammonia, to form a hydrazine-containing reaction product. This product commonly contains from about 1.5 to 2.0 weight percent of hydrazine, which is recovered by distillation or by precipitation as a hydrazine salt.

Hydrazine or a hydrazine salt such as hydrazine hydrochloride is often used in preparing hydrazodicarbonamide, which is an intermediate used in the manufacture of azodicarbonamide. Azodicarbonamide is widely used as a chemical blowing agent in the manufacture of cellular polymeric resin structures.

The Raschig process or its modification requires for its successful operation, the employment of small amounts of metal ion inhibitors or metal deactivators to obtain hydrazine in the presence of trace amounts of metal ions such as copper. Suitable inhibitors include proteinaceous materials like gelatin as well as glycine salts and other metal complexing agents. Gelatin is most commonly employed, although it tends to create foaming difficulties in the subsequent distillation and recovery of the hydrazine from the reaction product. Further, where ammonia is employed in the Raschig process a pressurized mixing vessel is normally required, while cost factors also dictate the recovering, compressing, and recycling of the unused ammonia in the process.

It is an object of our invention to reduce the cost of hydrazodicarbonamide by making it from relatively inexpensive basic starting materials.

Another object of our invention is to provide a novel process of making hydrazine in high yields.

A further object of our invention is to provide a process for making hydrazine without the use of a gelatin metal deactivator.

Another object of our invention is to provide a novel and improved process by which hydrazine, semicarbazide or hydrazodicarbonamide can be prepared by varying process conditions.

Further objects and advantages of our invention will become apparent to those skilled in the art from the foregoing description and examples of our process taken with the accompanying drawing which shows a schematic illustration of our process.

We have discovered that hydrazine can be made in good yields without the necessity of employing a gelatin metal deactivator. Further our process provides unexpectedly high yields of from up to 3.5 to 4.0 weight percent of hydrazine in the reaction product, while the elimination of gelatin avoids operational difficulties associated with the Raschig process. Additionally, our process is flexible in the nature of the resulting products, by virtue of simple variations in the process conditions and therefore provides a means of making hydrazine, semicarbazide or hydrazodicarbonamide as the operator desires employing basic starting materials. Briefly, our process comprises a first step of adding chlorine to an aqueous urea slurry comprising a mixture of urea and a saturated aqueous solution of urea, and a second step of reacting this solution with an aqueous caustic solution preferably a sodium hydroxide solution, thereby producing a hydrazine-containing reaction product. This order of the reaction steps is essential in obtaining the benefits of our discovery.

The third step of our process includes the addition of a non-oxidizing acid such as a strong mineral acid like sulfuric, hydrochloric, or phosphoric acid and the like to the hydrazine-containing reaction product. The fourth step of our process depends upon the end products desired, and requires the selection of certain pH, temperature, and time conditions, or a combination thereof as hereinafter described. For example, the reaction product from steps one and two of our process may be acidified with a nonoxidizing acid to a pH below 7.0 above 85° C. to precipitate hydrazodicarbonamide. The resultant hydrazodicarbonamide slurry may be used directly as a starting material for the manufacture of azodicarbonamide, or if desired the hydrazodicarbonamide may be separated by filtration, and purified by washing with water. It will be apparent that the advantage of this process resides not only in the use of inexpensive and readily available starting materials, but also in the fact that no isolation and purification of reaction intermediates are required for the manufacture of azodicarbonamide. Further the reaction product may be converted to substantially all semicarbazide by acidifying the hot reaction product with a nonoxidizing acid in an amount to lower the pH and yet maintain the pH above 7.0. Conversion to semicarbazide of the product may be obtained without acidification, however, we have found that the hot hydrazine reaction product is more stable at lower pH values such as between 7.0 and 9.0. Preferred conditions for recovering semicarbazide include a pH range of 7.0 to 9.0 and a temperature of between 50° C. and 90° C. Also the yield of hydrazine in the reaction product may be maximized by strongly acidifying the reaction product with a nonoxidizing acid to a pH of below about 2.0 and recovering the hydrazine at low temperatures as a hydrazine acid salt. Conversely the hydrazine may be recovered directly from the reaction product by conventional distillation procedures such as by azeotropic distillation with other organic liquids.

One preferred embodiment of our process is shown in the accompanying drawing in schematic form wherein as the first step of our process, one mole of gaseous or liquid chlorine is reacted with a stirrable aqueous urea slurry containing 3.3 moles of urea. As step two of our process, the clear chlorinated urea solution of step one is reacted with an aqueous caustic solution containing 4.0 moles of sodium hydroxide. Upon addition of the caustic the temperature of the reaction solution rises rapidly and the solution turns from colorless to slightly green to orange and then white as hydrazine is produced and the sodium chloride and sodium carbonate by-product salts precipitate out of the reaction solution. The ratio of semicarbazide to hydrazine in the ultimate reaction product depends in part on the temperature of the reaction which requires a minimum temperature of about 85° C. for the production of hydrazine or semicarbazide. Steps one and two of our process produce a reaction product having a temperature of at least 85° C., a pH about 11 to 12 and a hydrazine plus semicarbazide content (expressed as weight percent hydrazine) of 3.5 to 4.0 percent of the total reaction product. The molal ratio of hydrazine to semicarbazide is approximately 2 to 1. Where the ultimate product desired is hydrazodicarbonamide, the ratio of semicarbazide to hydrazine in the process liquor is relatively unimportant, since we have found that either or both components convert readily in our process to hydrazodicarbonamide. Since two moles of urea and one mole of hydrazine are required for each mole of hydrazodicarbonamide or one mole of urea and one mole of semicarbazide are required for each mole of hydrazodicarbonamide and our process is run with such a large excess of urea, there is no apparent advantage to control the semicarbazide to hydrazine ratio where the desired end product is hydrazodicarbonamide.

The third step of our process includes the addition of a nonoxidizing acid to the process liquor. The amount of nonoxidizing acids to be employed depends upon the ultimate end product desired. We have found sulfuric acid to be a particularly suitable nonoxidizing acid in our process, although other nonoxidizing mineral acids may be used.

Step four of our process includes the recovery of the desired components and requires the selection of process conditions. For example (Option I), where the yield of hydrazine is desired to be maximized a sufficient excess of a nonoxidizing acid is added to the reaction product to reduce the pH below about 2.0, and preferably between pH 1 and 2. The temperature of this solution is maintained below about 30° C., for example, in the range of from 0 to 30° C., whereupon the hydrazine salt such as hydrazine monosulfate will be precipitated within twenty-four hours.

Where semicarbazide is the desired (Option II) component the reaction product may be converted into substantially 100% semicarbazide by maintaining the pH above 7.0, for example, between about 7.0 and 9.0 by the addition of sufficient nonoxidizing acid to the alkaline reaction product. The temperature of this solution should be maintained between about 50 to 90° C. for example, 80 to 95° C. thereby producing semicarbazide. Higher temperatures should be avoided since the yield of hydrazodicarbonamide is increased with increased temperature. The semicarbazide thus formed or the semicarbazide in the original reaction product as a filtrate from the hydrazine recovery process may be recovered by the reaction of the aqueous semicarbazide solution with a ketone or aldehyde, which precipitates as an insoluble semicarbazone. The selection of the particular ketone or aldehyde to be employed in forming a semicarbazone depends upon the ultimate use of the end product. Thus, in commercial operations where the end use of the product would be directed toward the regeneration of semicarbazide, then aldehydes and ketones should be selected which form semicarbazones which readily hydrolyze. However, where the semicarbazone itself is the desired end product, selection of the aldehyde or ketone such as benzaldehyde should be based upon the ease of recovery of the derivative from the solution and thus may depend upon the insolubility of the semicarbazone in the aqueous reaction product.

Where hydrazodicarbonamide is desired as the end product (Option III) is employed, wherein sufficient nonoxidizing acid is added to maintain the pH below 7.0 for example, to maintain the pH from about 3 to about 6. The solution is then heated to above about 85 to 90° C., and preferably from 100 to 120° C. whereupon hydrazodicarbonamide precipitates and may be recovered.

Although the recovery of each product has been separately combined, it is recognized that all recovery steps may be employed to obtain all possible products from the reaction product. Thus in forming semicarbazide, some small amounts of hydrazodicarbonamide may be precipitated during the heating step and can be removed by filtration prior to precipitation of the semicarbazone. Also the filtrate from the hydrazine salt precipitation may contain trace amounts of hydrazine which can be converted to semicarbazide as described. We have described steps for our process in terms of conventional process conditions of pH and temperature, however, there is no sharp transition in end products in going from one set of process conditions to another, and thus these conditions may be varied slightly, for example by employing longer contactor reaction times than disclosed.

The fact that good yields are obtained without the use of an inhibitor is a surprising feature of our process particularly, since one would expect from experience with standard hydrazine processes that very little or no hydrazine would be obtained without the use of an inhibitor (see Metal Deactivators in Synthesis of Hydrazine, Industrial and Engineering Chemistry, volume 47, pages 1203–1206). While our process has been described without the necessity of a metal deactivator or inhibitor our process does not exclude the use of conventional inhibitors. For example, where a gelatin inhibitor can be tolerated, the addition of trace amounts of gelatin or other proteinaceous inhibitors such as animal glue, chelator agents and the like in an amount from 2 to 5 parts of gelatin per 100 parts of chlorine by weight will further increase the yield of hydrazine up to about 10 percent of these yields described. Thus, while gelatin is not required as an essential item of our process, its use may even further enhance the surprising hydrazine product yields.

*Example 1*

A 500 ml., round-bottom, three-neck flask was equipped with a stirrer, a thermometer, and a fritted glass gas inlet tube. An ice water bath was provided to cool the flask. 267 grams (4.45 moles) of urea and 20 ml. of water were charged to the flask and the temperature of the contents was brought to between 5 and 10° C. 96 grams (1.35 moles) of gaseous chlorine was added through the gas inlet tube, while holding the temperature between 5 and 10° C. Next, a 2-liter, four-neck, round-bottom flask was equipped with a stirrer, a thermometer, a dropping funnel, and a reflux condenser, and placed in a water bath, and 108 grams (2.70 moles) of sodium hydroxide, 2 grams of gelatin and 180 ml. of water were charged to the flask and brought to 35–40° C. One-half of the contents of the 500 ml. flask was then added to the caustic solution in the 2-liter flask rapidly while keeping the temperature at 35–40° C. The contents of the 2-liter flask was heated to 105–108° C. and held at that temperature for ten minutes. The slurry was then acidified with sulfuric acid, and heated to reflux (105–108° C.), and additional 66° Bé. sulfuric acid was slowly added to the slurry during reflux until a total of 140.5 grams of sulfuric acid had been added during acidification and refluxing. The product was then cooled to 25° C., filtered, and washed with water until the filtrate was neutral. The solid was dried at 105° C. to constant weight. The yield was 57 grams of hydrazodicarbonamide. The product was identified as hydrazodicarbonamide with sodium dichromate and sulfuric acid, in the manner described in detail in U.S. Patent No. 2,988,545, issued June 13, 1961, to Henry A. Hill for "Manufacture of Azodicarbonamide."

*Example 2*

Hydrazodicarbonamide was prepared as described in Example 1 above, except as herein noted. The chlorination of 267 grams of urea mixed with 20 ml. of water with 96 grams of chlorine was carried out at 5–10° C., as described in Example 1. The preparation of the sodium hydroxide solution with 108 grams of NaOH, 2 grams of gelatin and 180 ml. of water was carried out as described in Example 1, except that the solution was brought to 15 to 20° C., and held at that temperature while one-half of the chlorinated urea product was added with stirring. The admixture was then heated to 90 to 95° C. and held at that temperature for 45 minutes. The resultant slurry was then acidified and refluxed with the addition of sulfuric acid, and the product recovered as described in Example 1. The yield of hydrazodicarbonamide was 70 percent by weight of the theoretical, based on the weight of chlorine used.

Examples 3 to 17

The following table summarizes Examples 3 to 17, which were each carried out as Example 2, except for the particular change noted in the table. In the table, yields are given in percent of the theoretical yield of hydrazodicarbonamide by weight, based on the weight of chlorine used.

EFFECT OF VARIATIONS IN PROCESS VARIABLES IN PRODUCING HYDRAZODICARBONAMIDE

| Example | Variable | Standard | Used | Yield percent |
| --- | --- | --- | --- | --- |
| 3 | Amt. Urea in Step 1 | 267 grams | 240 grams | 60 |
| 4 | | | 290 grams | 70 |
| 5 | Chlorination temp. in Step 1 | 5–10° C | 0–5° C | 70 |
| 6 | | | 10–30° C | 70 |
| 7 | Water—Step 1 | 20 ml | 80 ml | 51 |
| 8 | Gelatinin Step 2 | 2 grams | None | 58 |
| 9 | | | 3 grams | 71 |
| 10 | Inhibitor—in Step 2 | 2 grams gelatin | 2 gm. Sodium Salt of Diethanolglycine. | 67 |
| 11 | NaOH, Step 2 | 108 grams | 102 grams | 53 |
| 12 | | | 135 grams | 70 |
| 13 | Conc. of NaOH, Step 2 | 180 ml. water | 154 ml. water | 55 |
| 14 | Addition temp., in Step 2 | 15–20° C | 0–10° C | 70 |
| 15 | Reaction temp. in Step 3 | 90–95° C | 105–108° C | 70 |
| 16 | Reaction time in Step 3 | 45 min | 15 min | 48 |
| 17 | | | 90 min | 59 |

We have found also that in step one a large excess of urea in the chlorination makes the chlorination product more stable during handling, and in the subsequent steps of the process than if the mole ratio of urea to chlorine approaches 1.0. The preferred amount and the amount used in Example 2, is 3.3 moles per mole of chlorine. As shown by Example 3, the yield is decreased by reducing the charge of urea to 240 grams which corresponds to 3.0 moles of urea per mole of chlorine. An excess of urea of more than 5.0 moles per mole of chlorine does not produce any additional beneficial results. It is desirable to use as little more than this amount of urea as is consistent with a high yield of the end product such as hydrazodicarbonamide. As shown by Example 4, increasing the charge to 3.6 moles of urea per mole of chlorine does not result in an observable increase in yield over that obtained in Example 2. Accordingly, while good results can be obtained with wide variations in the urea/chlorine ratio, we prefer to employ the ratio of about 3.3 to 1. We have found that optimum results are obtained when all of the urea is charged during the chlorination process. However, appreciable yields may be obtained by charging as little as one mole of urea per mole of chlorine, and adding the remainder at any later time prior to the step of acidifying or acidifying and heating the reaction mixture of steps one and two.

As an indication of the benefits obtained by charging all of the urea to be used in the process before or during the chlorination step, we have carried out the process of Example 2, with 2.05 moles of urea per mole of chlorine charged before chlorination, and 1.25 moles of urea per mole of chlorine charged after acidification of the product prior to refluxing with the addition of acid as in Example 2. This process yielded 90 grams of hydrazodicarbonamide, melting at between 249° and 253° C., a yield of 56.6 percent of the theoretical, based on the chlorine used.

The temperature at which the urea is chlorinated in the first step of our process is determined by the facts that the slurry is more difficult to stir at lower temperatures, and that the yield is less at higher temperatures. A satisfactory temperature range is 0–30° C. As shown by Examples 5 and 6, there is no difference in yield between chlorinating at 10–30° C. Below 0° C. the slurry may be difficult to stir, and there could be some chlorine loss if chlorination is carried out much above 30° C.

The amount of water used during the step one is preferably the minimum amount which will permit the slurry to be stirred properly during the reaction. We have found that increasing the amount of water used will adversely affect the yield of hydrazodicarbonamide, as shown in Example 7. Also, the chlorination reaction product is less stable if more water is used. The clear chlorinated urea reaction solution contains about 25 percent chlorine, is relatively stable, and an easily handled liquid of high active chlorine content, which has utility in concentrated or diluted form as a bleaching and oxidizing agent for paper, pulp, textiles, etc. The minimum ratio of water to urea is determined by the efficiency of the chlorinator stirring device. A urea/water weight ratio of 13/1 can be handled conveniently in a conventional stirred reactor, but even less water could be used advantageously with proper agitation. We have found that the total amount of water used may be effectively decreased by withholding part of the urea charge until about 5 percent of the chlorine has been added. This small amount of chlorine effects a surprising reduction in the viscosity of the urea slurry. In the chlorination step, either liquid or gaseous chlorine may be used without a noticeable difference in results. We have found it preferable in the second step of our process to use at least 3.75 moles of sodium hydroxide per mole of chlorine. As illustrated by Examples 2, 11 and 12, an increase in the amount of sodium hydroxide above this value does not improve the yield. It is desirable to use the sodium hydroxide in as concentrated a solution as possible, to reduce the reactor volume required. In Example 2, a 37.5 percent by weight solution is employed. However, a more concentrated solution will result in reduced yield, as shown by Example 13.

The temperature at which the chlorinated urea slurry produced in step one is added to the caustic solution in step 2 of the process of our invention is not particularly critical, so long as it is below about 95° C. The maximum useable addition temperature depends on the amount of excess urea in the chlorinated slurry, the concentration of the caustic solution, and the efficiency of the mixing device. As noted above, the stability of the chlorurea component of the chlorinated slurry is greater if a larger excess of urea is present, and less if more water is present. More efficient mixing prevents local temperature in the batch from appreciably exceeding the bulk temperature. In a batch reactor, we have found that 35 to 40° C. is a convenient mixing temperature, as exemplified by Example 1. Lowering the mixing temperature, as in Examples 2 and 14, did not appreciably affect the yield. If the residence time in the mixing zone is reduced, as by the use of a continuous flow reactor, the mixing temperature may be allowed to approach the final reaction temperature.

We have found that there is an optimum reaction time for a given reaction temperature. As shown by Example 1, ten minutes is usually sufficient at temperatures between 105 and 108° C. Example 15 shows little change in yield after 45 minutes at this temperature. The reaction time can be lowered still further by increasing the temperature above 108° C., as by refluxing the reaction mixture under pressure. At 90 to 95° C., the reaction is complete in 45 minutes. As illustrated by Examples 2, 16 and 17, at a reaction temperature of 90 to 95° C., reaction times of 15 minutes and 90 minutes both result in yields lower than that obtained after 45 minutes, indicating the presence of an optimum yield in the vicinity of 45 minutes. The optimum residence time depends upon reactor configuration, reaction temperature, and mixing efficiency. In a continuous 2" jacketed pipe reactor held at 110° C. for substantially its entire length, of about 30 feet, a residence time of about 30 seconds is sufficient for complete reaction.

In the precipitation of hydrazodicarbonamide by heating with acid (Option III), at least one equivalent of acid is required for each equivalent of caustic used. If desired, sodium carbonate may be filtered out before or during the third step (acidification), thereby reducing the acid required by two equivalents for each mole of sodium carbonate removed. Any nonoxidizing mineral acid or an acidic salt of such an acid may be employed, although we have found sulfuric acid to be the most convenient and economical acid. The conditions for acid addition are not critical, so long as the slurry is brought to the necessary temperature for a suitable period of time after the calculated theoretical amount of acid has been added. In preparing hydrazodicarbonamide the slurry is held at temperatures at least above 85° C. until standard chemical tests show that there is essentially no reducing agent remaining in the slurry.

*Example 18*

One preferred method of our invention includes the carrying out of step one and step two of our novel process as described in Example 2, but employing 267 grams (4.45 moles) of urea and 96 grams (1.35 moles) of clorine in step one. Step two includes the use of 216 grams of sodium hydroxide (5.40 moles) and reacting this solution with the chlorinated solution of step one. The reaction mixture contains 29.2 grams of hydrazine (0.92 moles) which represents 0.635 moles of hydrazine and 0.285 moles of semicarbazide. The precipitation of semicarbazide and monohydrazine sulfate as heretofore described yields approximately 50.5 grams of a monohydrazine sulfate (0.39 moles) and 30.8 grams of semicarbazide (0.41 moles). The monohydrazine sulfate yield is about 42.4 percent of theoretical based on the hydrazine content, while the semicarbazide may be precipitated from the process stream as benzaldehyde semicarbazone. If it is desired to convert this reaction product to hydrazodicarbonamide about 105 grams of hydrazodicarbonamide is obtained which is approximately a 65 percent yield based on chlorine.

*Example 19*

Laboratory analysis has shown that the analyzed hydrazine content of the above reaction mixture of step one and step two is composed of 67.8 percent hydrazine and 31.0 percent semicarbazide on a molar basis. The hydrazine component was recovered by precipitating the hydrazine as monohydrazine sulfate. The precipitation was carried out in the presence of a molar excess of 66° Bé. sulfuric acid at 5 to 10° C. in a slowly stirred reactor for 24 hours. The white insoluble product was filtered, washed to neutrality with room temperature demineralized water, and dried at 110° C. for eight hours to a moisture content of less than 0.3 percent. Titration of the product with potassium iodate and hydrochloric acid resulted in a hydrazine assay of 24.4 percent by weight. This agreed very closely with theoretical value for monohydrazine sulfate.

The filtrate from the monohydrazine sulfate separation was brought to a pH range of 5 to 7 with 50 percent sodium hydroxide solution at 25° C. With rapid stirring, a molar excess of benzaldehyde was added at a steady rate as a white precipitate formed. The product slurry was stirred for 30 minutes at 25° C. after the benzaldehyde addition was completed, and the product was separated by filtration. The filter cake was washed repeatedly with room temperature demineralized water and dried at 110° C. for eight hours to a moisture content of less than 0.3 percent. A sample of the dried product melted sharply on a Fisher-Johns melting point apparatus at 220 to 225° C. (literature melting point for benzaldehyde semicarbazone is 222° C.).

A sample of the filtrate from the product separation gave no significant reaction with potassium iodate and hydrochloric acid indicating that all the hydrazine and semicarbazide components of the original sample had been converted to their respective derivatives.

*Example 20*

As described our process permits the conversion of the reaction mixture to semicarbazide. A better than 90 percent conversion to semicarbazide has been attained consistently by our method. During the reaction, about 1 to 5 percent of the hydrazine content is converted to hydrazodicarbonamide.

In this conversion process, the reaction product of steps one and two of Example 18 is heated at 85 to 90° C. for 6 hours at a pH range of 7 to 8. If the pH is allowed to fall below 7.0, a larger amount of hydrazodicarbonamide is formed. In the same manner, heating above about 90° C. tends to favor hyrazodicarbonamide preparation. At the end of the reaction period, the batch is cooled to 25 to 30° C. and filtered to remove the small amount of hydrazodicarbonamide formed. At this point the filtrate can be treated with 66° Bé. sulfuric acid to precipitate any small amounts of hydrazine that are unconverted to semicarbazide.

The semicarbazide is then isolated as the semicarbazone with benzaldehyde by a room temperature precipitation of the product. The precipitate is separated by filtration and washed and dried at 110° C. to a less than 0.3 percent moisture. The melting range of the product is 220 to 225° C.

The filtrate from the benzaldehyde semicarbazone separation is titrated with potassium iodate and hydrochloric acid to determine if any significant amounts of semicarbazide remain in solution.

The following data is representative of this conversion:

| Reaction mixture of steps one and two: | Moles | |
| --- | --- | --- |
| Hydrazodicarbonamide | 0.024 | 0.404 moles hydrazine and 0.191 moles semicarbazide. |
| Monohydrazine sulfate | 0.011 | |
| Benzaldehyde semicarbazone | 0.545 | |
| Unprecipitated semicarbazide | 0.015 | |

*Example 21*

Semicarbazide was recovered as benzaldehyde semicarbazone because of the ease of recovery of the derivative due to its water insolubility. In commercial operations, however, where the end use of the product might be directed towards the regeneration of semicarbazide, other aldehyde and ketone semicarbazones which are hydrolyzed at a much faster rate would be of more importance. For example, aromatic aliphatic or alicyclic carbonyl compounds such as aldehydes or ketones such as those readily available products of furfural and acetone may be used to obtain semicarbazide derivatives. The acetone semicarbazone is easily hydrolyzed rapidly on the acid side to regenerate a semicarbazide solution. For example, a furfural semicarbazone was prepared by adding a 20 percent molar excess of furfural with good stirring to a semicarbazide solution at pH 5 to 7 prepared as described in Example 19. The addition was made at 25° C. and the product slurry was further stirred for 1½ hours after the furfural addition had been completed. The product was isolated by filtration, washed, and dried at 110° C. to a moisture content of less than 0.30 percent. The Fisher-Johns melting point of the product was 198 to 205° C.

The following data is representative of this preparation:

|  | Moles |
|---|---|
| Semicarbazide | 0.525 |
| Furfural | 0.630 |
| Furfural semicarbazone | 0.446 |

*Example 21*

An acetone semicarbazone was prepared by adding a 20 percent molar excess of acetone with good stirring to a semicarbazide solution at pH 2 to 4 and containing 3 grams of aniline hydrochloride. The acetone was added to the semicarbazide solution at 25° C. and stirring was continued for 1½ hours. The product was isolated in the usual manner and dried at 110° C. until the moisture content was less than 0.30 percent. The isolation of this product in high yield is difficult because of a relatively high solubility in water. The Fisher-Johns melting point of this compound was 185 to 190° C.

The following data is representative of this preparation:

|  | Moles |
|---|---|
| Semicarbazide | 0.395 |
| Acetone | 0.475 |
| Acetone semicarbazone | 0.313 |

Acetone semicarbazone readily hydrolyzes on the acid side to prepare semicarbazide solutions. Acetone semicarbazide was suspended in a minimum amount of water with an equal molar concentration of 37.8 percent hydrochloric acid. The dispersion was heated to 60° C. to effect complete solubility of the product. A 5.8 percent semicarbazide solution resulted from this hydrolysis. Care must be taken that heating of the solution is not prolonged or hydrazodicarbonamide may begin to form as a reaction product of the regenerated semicarbazide.

Hydrolysis of the acetone semicarbazone on the basic side proceeds at a slower rate than the acid hydrolysis. For this reason higher temperatures and longer reaction periods must be maintained thus increasing the formation of the by-product hydrazodicarbonamide.

*Example 22*

The clear chlorinated reaction mixture of step one in Example 18 was diluted with water to yield a 5.0 weight percent available chlorine solution. This stable solution was then used to successfully bleach an Osnaburg Greige woven fabric composed of cotton yarns. Bleaching by this stable solution which includes monochlorourea and urea was carried out at 40° C. for two hours in an agitated vessel. The tensile strength of the bleached fabric appeared to be the same as that of the original unbleached material.

The composition of the chlorinated urea slurry, starting with 1 mole of chlorine and $n$ moles urea (where $5.0 > n > 2.7$) is

|  | Moles |
|---|---|
| $NH_2CONHCl$ | 1.0 |
| $NH_2CONH_2 \cdot HCl$ | 1.0 |
| $NH_2CONH_2$ | $n-2$ |

Our novel process has been described employing solely urea, however, at least a portion of the urea of step one may be replaced with ammonia. Thus in preparing hydrazine, semicarbazide, or hydrazodicarbonamide up to one mole of the urea employed in step one may be replaced by up to 1 mole of gaseous or liquid ammonia or an aqueous ammonia solution. Where ammonia is used economical operation of the process might require the excess ammonia to be stripped off, compressed and recycled for reuse in the process.

As noted above, sodium carbonate may be filtered out of the caustic reaction product before or during acidification. Substantial portions of the other inorganic salts formed may also be removed by filtration at any stage after the caustic reaction and before the precipitation of hydrazodicarbonamide.

Further we have employed sodium hydroxide which is readily and economically available as the preferred caustic in our process, however, other caustics such as other inorganic or oxides, hydroxides, and basic salts such as potassium hydroxide, calcium oxide, and the like may be used in whole or part in place of sodium hydroxide.

Though we have illustrated the process of our invention by batch process examples, it will be apparent to those skilled in the art that the process could be carried out continuously in conventional continuous process apparatus.

While we have described various examples of the process of our invention in detail, many changes and variations will be apparent to those skilled in the art upon reading our description, and such may obviously be made without departing from the scope of our invention.

Having thus described our invention, what we claim is:

1. A process of making hydrazine and semicarbazide comprising the steps of: adding chlorine to an aqueous slurry of urea thereby providing a chlorinated urea mixture containing an excess of urea; and adding this chlorinated mixture to an aqueous hydroxide solution, thereby producing a reaction product containing hydrazine and semicarbazide.

2. A process as described in claim 1 wherein the process is carried out in the presence of a small but effective amount of a metal ion inhibitor.

3. A process as described in claim 1 wherein the process includes: adding a sufficient amount of a nonoxidizing mineral acid to the reaction mixture to obtain a pH of below 2.0; and maintaining the temperature of the acidified mixture between about 0° C. and 30° C. for a sufficient time to precipitate the hydrazine acid salt.

4. A process as described in claim 1 wherein the process includes: adding a sufficient amount of a non-oxidizing mineral acid to acidify the reaction product; and heating the acidified reaction product to a temperature of at least 85° C. thereby precipitating hydrazodicarbonamide.

5. A process as described in claim 1 wherein the process includes: maintaining the reaction product at a temperature of between about 50° C. and 95° C. to convert at least a portion of the hydrazine into semicarbazide.

6. A process as described in claim 1 wherein the process includes: adding a sufficient amount of a nonoxidizing mineral acid to the reaction product to obtain a pH of between about 7.0 and 9.0; and maintaining the temperature between about 50° C. and 95° C. for a period of time to convert the desired amount of hydrazine to semicarbazide.

7. A process as described in claim 6 wherein the semicarbazide is recovered from the aqueous reaction product as a semicarbazone.

8. A process for making hydrazine and semicarbazide comprising the steps of: adding one mole of chlorine to an aqueous slurry of urea at a temperature of between about 0° C. and 30° C. said slurry containing from about 2.7 to 5.0 moles of urea; and adding the chlorinated slurry to an aqueous solution containing at least 3.75 moles of sodium hydroxide at a temperature of at least 85° C. to provide a reaction product containing hydrazine and semicarbazide.

9. A process as described in claim 8 wherein the process includes: adding a sufficient amount of sulfuric acid to obtain a pH of below 2.0; cooling the acidified product to a temperature of between 0° C. and 30° C.; and recovering the precipitated hydrazine salt.

10. The process of making hydrazine and semicarbazide comprising the steps of: adding one molar part of chlorine to about 3.3 molar parts of urea in an aqueous slurry; and reacting the chlorinated slurry with a stirrable aqueous solution containing about 4 molar parts of sodium hydroxide at a temperature of at least 85° C. thereby producing a reaction product containing hydrazine and semicarbazide.

11. A process of making hydrazine and semicarbazide comprising the steps of: adding one mole of chlorine to an aqueous slurry of urea at a temperature of between about 0° C. and 30° C. said slurry containing from about 2.7 to 5.0 moles of urea; adding the chlorinated slurry to an aqueous solution containing at least 3.75 moles of hydroxide at a temperature of at least 85° C. to provide a reaction product containing hydrazine and semicarbazide; removing the inorganic salts of the reaction from the reaction product; adding a sufficient amount of a nonoxidizing mineral acid to obtain a pH of below 2.0; cooling the acidified product to a temperature of between 0° C. and 30° C.; filtering out the precipitated hydrazine salt; and recovering the semicarbazide from the filtrate.

12. A process of making semicarbazide comprising the steps of: adding one mole of chlorine to an aqueous slurry containing from about 2.7 to about 5.0 moles of urea; adding this chlorinated slurry to an aqueous solution containing at least 3.75 moles of sodium hydroxide; adding a sufficient amount of a nonoxidizing mineral acid to obtain a pH of the reaction product between about 7.0 and 9.0; and maintaining this reaction product at a temperature of from 50° C. to 95° C. for a sufficient period of time to convert the desired amount of hydrazine to semicarbazide.

13. A method as defined in claim 12 which includes: adding a sufficient amount of a carbonyl compound selected from the class consisting of aldehydes and ketones to the reaction product to form an insoluble semicarbazone.

14. A process as defined in claim 12 wherein the semicarbazide is recovered as benzaldehyde semicarbazone.

15. A process as defined in claim 12 wherein the semicarbazide is recovered as furfural semicarbazone.

16. A process as defined by claim 12 wherein the semicarbazide is recovered from an acid solution as acetone semicarbazone.

17. The process of making hydrazodicarbonamide comprising the steps of: adding chlorine to an aqueous slurry of urea; adding the chlorinated slurry to an aqueous solution of sodium hydroxide; acidifying the reaction product with sulfuric acid; and heating the acidified product to at least 85° C. to precipicate solid hydrazodicarbonamide.

18. The process as defined in claim 17 in which solid inorganic salts are removed by filtration after the second step and before the fourth step.

19. The process as defined in claim 17 in which the solution of sodium hydroxide contains an effective amount of gelatin.

20. The process as defined in claim 17 wherein the acidified reaction product is heated to 100° C. to 120° C.

21. The process as defined in claim 17 in which sufficient acid is employed to acidify the reaction product to a pH of about 3.0 to 6.0.

22. The process of making hydrazodicarbonamide comprising the steps of: adding one mole of chlorine to an aqueous slurry of urea at a temperature of between about 0° C. and 30° C. said slurry containing from about 2.7 to 5.0 moles of urea; adding the chlorinated slurry to an aqueous solution containing at least 3.75 moles of sodium hydroxide at a temperature of at least 85° C. to provide a reaction product containing hydrazine and semicarbazide; adding a sufficient amount of sulfuric acid to acidify the reaction product; and heating the acidified product to a temperature of above 85° C. to precipitate hydrazodicarbonamide.

23. The process of making hydrazodicarbonamide comprising the steps of: adding one mole part of chlorine to a stirrable aqueous slurry of urea containing about 3.3 moles of urea; reacting the chlorinated slurry with an aqueous solution containing about 3.75 to 5.0 moles of sodium hydroxide at a temperature of at least 85° C.; adding sufficient sulfuric acid to obtain a pH of between 3.0 and 6.0; and heating the acidified product to precipitate solid hydrazodicarbonamide.

References Cited by the Examiner

UNITED STATES PATENTS

| | | | |
|---|---|---|---|
| 1,959,503 | 5/1934 | Seuffert et al. | 260—554 |
| 2,692,281 | 10/1954 | Newby et al. | 260—554 |
| 2,798,886 | 7/1957 | Donaruma | 260—554 |
| 2,921,911 | 1/1960 | Staubly et al. | 252—187 |
| 3,003,971 | 10/1961 | Prichard | 252—187 |
| 3,065,040 | 11/1962 | Waibel | 8—108 |
| 3,120,424 | 2/1964 | Ruedi | 8—108 |

FOREIGN PATENTS 214,400  4/1958  Australia.

OTHER REFERENCES

Audrieth et al.: Chemistry of Hydrazine (1951) pages 28 to 38, page 36 is particularly relied upon.

Byrkit et al.: "Hydrazine in Org. Chem.," Ind. and Eng. Chem., vol. 42 (1950) pages 1862 to 1875 at pages 1868.

Sidgwick: Organic Chemistry of Nitrogen (1937) page 287.

IRVING MARCUS, *Primary Examiner.*

NICHOLAS S. RIZZO, *Examiner.*